United States Patent
Wu

(10) Patent No.: US 6,489,560 B1
(45) Date of Patent: Dec. 3, 2002

(54) POSITIONING DEVICE OF LAMP ROD USED IN CEILING LAMP OF WIRE BOX

(76) Inventor: Wen-Chang Wu, 235 Chung - Ho Box 8-24, Taipei (TW)

( * ) Notice: Subject to any disclaimer, the term of this patent is extended or adjusted under 35 U.S.C. 154(b) by 0 days.

(21) Appl. No.: 10/042,459

(22) Filed: Jan. 10, 2002

(51) Int. Cl.[7] .................................................. H02G 3/18
(52) U.S. Cl. .................. 174/65 R; 174/48; 174/50; 174/59; 174/158 R; 174/64; 285/136.1; 285/154.1; 285/189; 313/324; 439/445
(58) Field of Search .................................. 174/65 R, 48, 174/50, 52.1, 59, 158 R; 248/226.11, 251, 311; D26/138; 313/331; 285/120.1, 154.1; 362/432; 439/207, 450, 611

(56) References Cited

U.S. PATENT DOCUMENTS 3,783,321 A * 1/1974 Patterson .................. 174/65 R
5,883,332 A * 3/1999 Collard ......................... 174/57
6,082,782 A * 7/2000 Bartholoma et al. ...... 174/65 R

* cited by examiner

Primary Examiner—Dean A. Reichard
Assistant Examiner—Anton B Harris

(57) ABSTRACT

A positioning device of a lamp rod used in a ceiling lamp of a wire box comprises a retaining seat fixed to a via hole of the wire box and an inserting rod inserted into the retaining seat. An inserting portion exactly passes through the via hole. A top surface of the retaining seat at the inner side of the wire box is a platform which has a through hole and a locking hole. The platform is locked with a limiting unit having a size exactly locking the inserting rod. A top end of the inserting rod has a buckling hole. After the inserting rod has been inserted from the engaging hole of the retaining seat, the buckling hole is exactly buckled with the embedding portion of the positioning rod. Thereby, the inserting rod and the wire box are detachable and thus the space for storage and transfer is reduced.

5 Claims, 5 Drawing Sheets

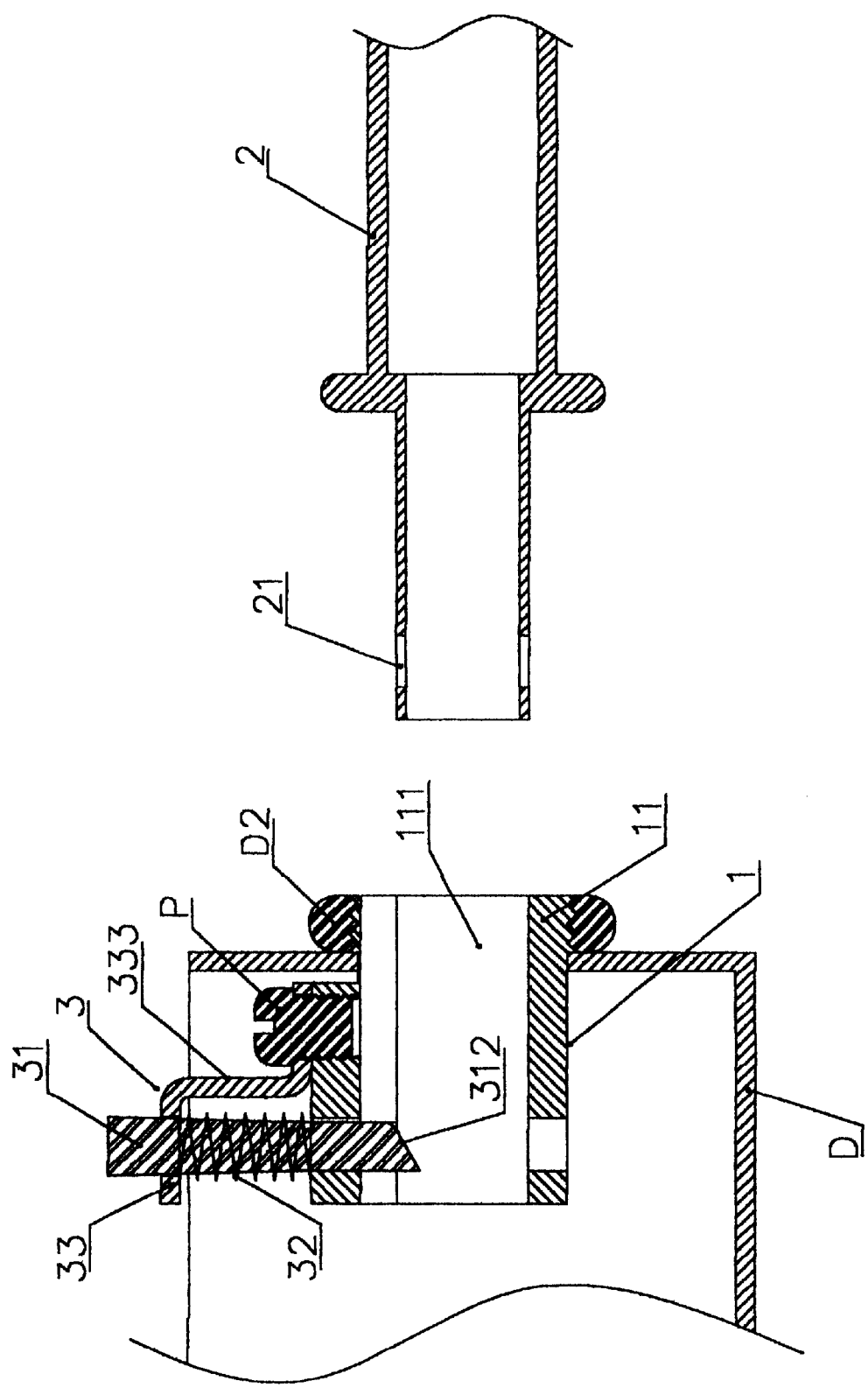
FIG3-A

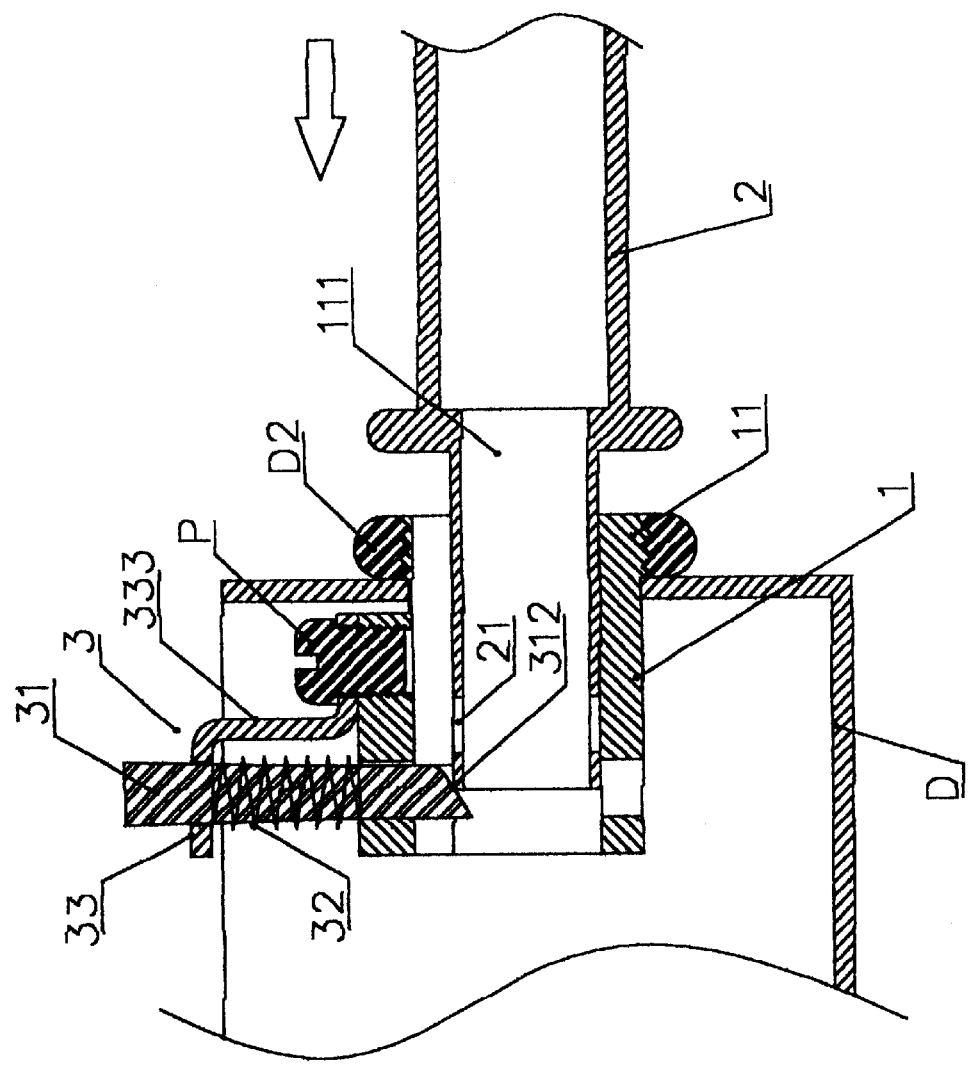
FIG3-B

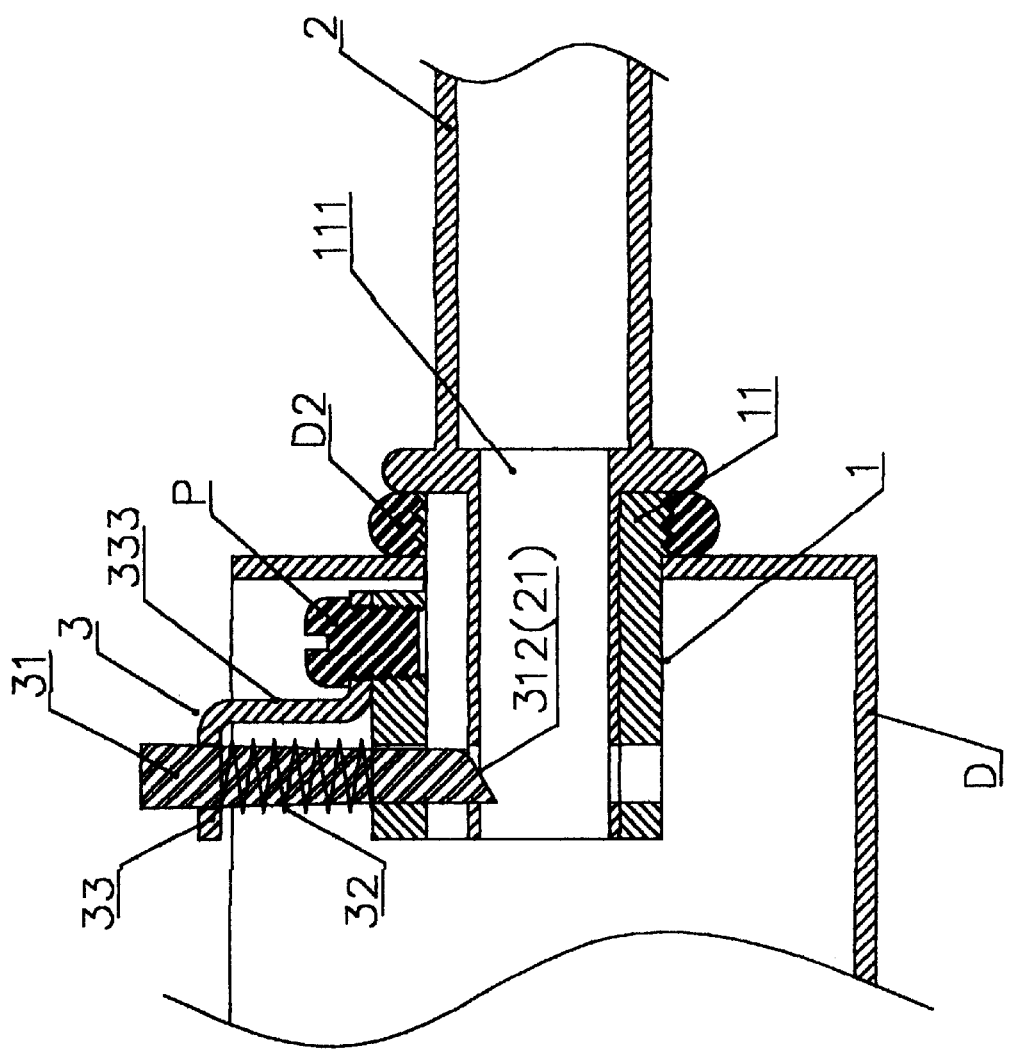
FIG3-C

POSITIONING DEVICE OF LAMP ROD USED IN CEILING LAMP OF WIRE BOX

FIELD OF THE INVENTION

The present invention relates to positioning devices, and particularly to a positioning device of a lamp rod used in a ceiling lamp of a wire box, wherein inserting rod and the wire box are detachable and thus the space for storage and transfer is reduced.

DESCRIPTION OF THE RELATED ART

Prior wire connection devices of lamps, such as wall lamps, stand type lamps, ceiling lamps, use studs and nuts to lock the components. In assembly, not only the user is easy to be harmed, but also other locking tools (such as spanners, openers, etc.) are necessary. Moreover, in assembly, electric wires are easy to expose out and some dangers are induced. Thereby, the prior art is not suitable to be assembled by the user. In general, the manufacturer assembles the device in advance, namely, the wire box is assembled with inserting rods in the manufacturing process. However, this will induce that a large space is required for transferring and storing the wire connection device and thus cost is increased.

SUMMARY OF THE INVENTION

Accordingly, the primary object of the present invention is to provide a positioning device of a lamp rod used in a ceiling lamp of a wire box, wherein an inserting rod can be pulled from the retaining seat, in packaging, transferring or storage, the wire box and inserting rod can be detached and then stored separately so as to reduce the required space. Since the retaining seat of the inserting rod is assembled within the wire box in advance. The user can insert the inserting rod into the retaining seat in the wire box without any locking tools. Therefore, the present invention can be assembled conveniently.

To achieve above objects, the present invention provides a positioning device of a lamp rod used in a ceiling lamp of a wire box comprises a retaining seat fixed to a via hole of the wire box and an inserting rod inserted into the retaining seat. An inserting portion exactly passes through the via hole. A top surface of the retaining seat at the inner side of the wire box is a platform which has a through hole and a locking hole. The platform is locked with a limiting unit having a size exactly locking the inserting rod. A top end of the inserting rod has a buckling hole. After the inserting rod has been inserted from the engaging hole of the retaining seat, the buckling hole is exactly buckled with the embedding portion of the positioning rod. Thereby, inserting rod and the wire box are detachable and thus the space for storage and transfer is reduced.

The various objects and advantages of the present invention will be more readily understood from the following detailed description when read in conjunction with the appended drawing.

BRIEF DESCRIPTION OF THE DRAWINGS

FIG. 3-A is a plane cross sectional view of the present invention in normal condition.

FIG. 3-B is a plane cross sectional view of the present invention wherein the inserting rod is being inserted into the retaining seat.

FIG. 3-C is a plane cross sectional view of the present invention wherein the inserting rod has been inserted into the retaining seat.

DETAILED DESCRIPTION OF THE PREFERRED EMBODIMENTS

Figure 1:
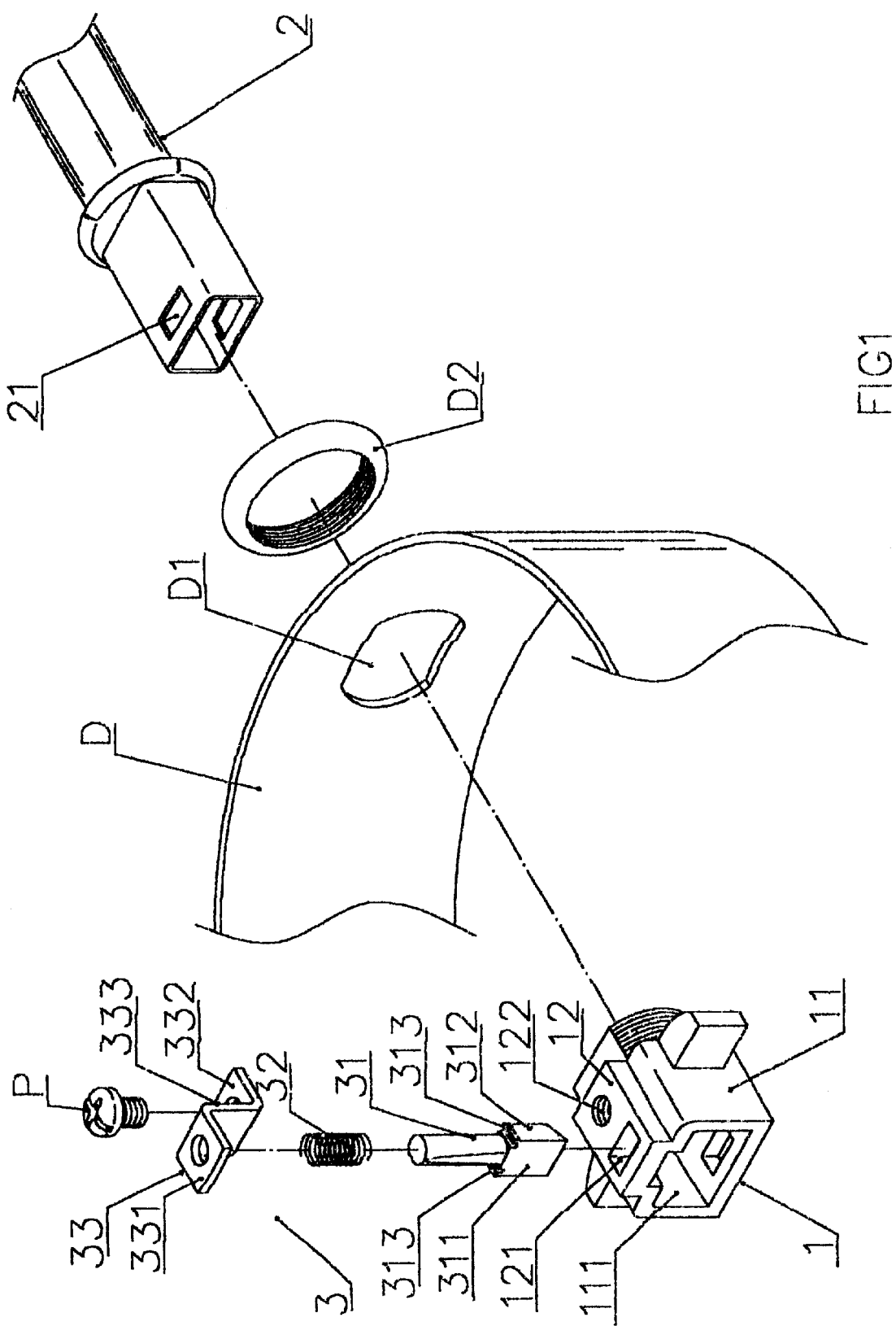
FIG. 1 is a perspective view of the present invention.
Figure 2:
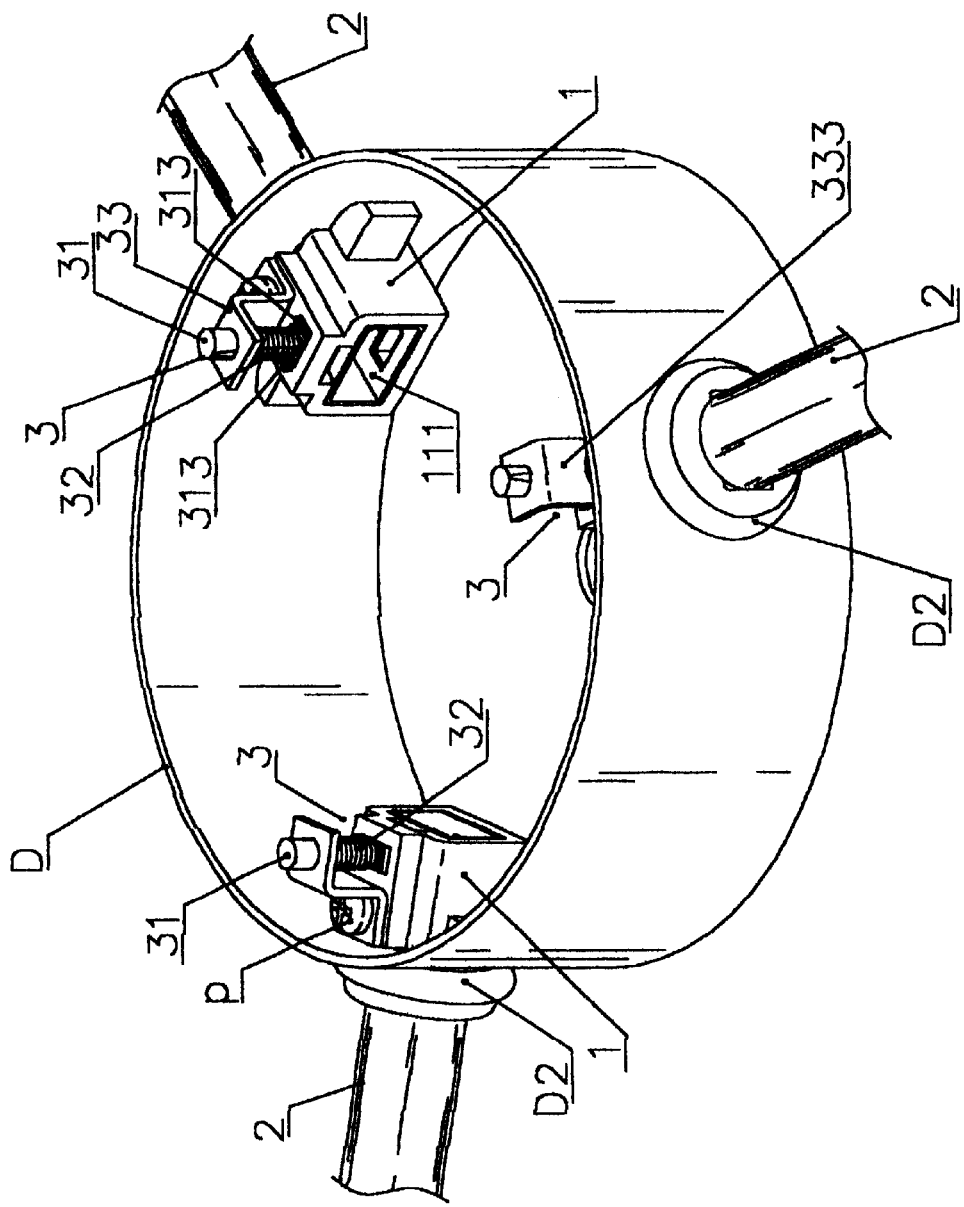
FIG. 2 is an assembled view of the present invention.

With reference to FIGS. 1 and 2, the structure and form of the present invention is illustrated. The buckled lamp rod positioning structure of a ceiling lamp of a wire box according to the present invention includes a retaining seat 1 fixed to the via holes D1 at the lateral side of the wire box D and an inserting rod 2 inserted into the retaining seat 1.

An inserting portion 11 exactly passing through the via hole D1 of the wire box extended from the lateral side of the retaining seat 1. The inserting portion 11 is installed with an oblate inserting hole 111. A positioning ring D2 is locked to an outer periphery of the portion of the inserting portion 11 passing through the wire box for fixing the retaining seat 1 to the inner side of the wire box D. The top surface of the retaining seat 1 at the inner side of the wire box D is a platform 12. The platform 12 has a through hole 121 and a locking hole 122.

The platform 12 at the top of the retaining seat 1 is locked with a limiting unit 31 having a size exactly locking the inserting rod 2. The limiting unit 31 is formed by a positioning rod 31 vertically inserted into the through hole 121 of the retaining seat 1, a spring 32 enclosing the positioning rod 31, a press 33 with a top and a bottom being protruding with respective sheets.

The bottom of the positioning rod 31 has an embedding portion 311 protruding to the engaging hole 111 of the retaining seat 1. One face of the embedding portion 311 facing to the inserting end of the inserting rod 2 is a tilt surface 312. The two sides of the upper portion of the embedding portion 311 are extended with buckling blocks 313 which are exactly buckled at the upper side of the through hole 121 for limiting the positioning rod 31 not to drop down from the through hole 121.

The top horizontal surface 331 of the press 33 is engaged with the positioning rod 31 at the upper end of the spring 32. The lower horizontal surface 332 is exactly aligned to the locking hole 122 of the retaining seat 1. Then, the stud P locks the press 33 to the retaining seat 1. The vertical surface 333 of the press 33 is slightly lower than the height of the spring 32 in normal condition. After the press 33 is locked, the spring 32 is slightly compressed and resists against the buckling blocks 313 of the positioning rod 31so that the positioning rod 31 is positioned to the upper side of the retaining seat 1.

The inserting rod 2 is aligned to a via hole D1 of the wire box D and has a rectangular shape. The top end of the inserting rod 2 has a buckling hole 21. Thereby, after the inserting rod 2 has been inserted from the engaging hole 111 of the retaining seat 1, the buckling hole 21 at the top of the inserting rod 2 is exactly buckled with the embedding portion of the positioning rod 31.

The operation of the present invention is illustrated in FIG. 3. In normal condition of the wire box D, the embedding portion 311 of positioning rod 31 protrudes to the interior of the engaging hole 111 due to the action of the spring 32 (referring to FIG. 3-A).

Since the portion of the embedding portion 311 of the positioning rod 31 aligned to one end of the inserting rod 2 is a tilt surface, as the inserting rod 2 inserts into engaging hole 111, one end of the inserting rod 2 exactly resists against the embedding portion 311 of the press 33 to move upwards. Moreover, the buckling blocks 313 on the embedding portion 311 exactly ejects and compresses the spring 32 (referring to FIG. 3-B).

After the inserting rod 2 has been inserted completely, the buckling hole 21 on the upper side of the inserting rod 2 is exactly aligned with the positioning rod 31 so that the embedding portion 311 of the positioning rod 31 is buckled with the buckling hole 21 of the inserting rod 2 with a downward force. Since the embedding portion 311 of the inserting rod 2 has a tilt surface at one side, the inserting rod 2 within the retaining seat 1 does not retract backwards and thus is confined in the retaining seat 1 (referring to FIG. 3-C).

It is appreciated that the inserting rod 2 must be buckled by the positioning rod 31 and thus is confined in the retaining seat 1. If it is necessary to withdraw the inserting rod 2, a force is necessary to lift the positioning rod 31 so that the buckling blocks 313 press the spring 32 again and the embedding portion 311 of the positioning rod 31 is released from the inserting rod 2.

In the wire box D, the inserting rod 2 can be pulled from the retaining seat 1, in packaging, transferring or storage, the wire box D and inserting rod 2 can be detached and then stored separately so as to reduce the required space. Since the retaining seat 1 of the inserting rod 2 is assembled within the wire box D in advance. The user can insert the inserting rod 2 into the retaining seat 1 in the wire box D without any locking tools, such as screws. Therefore, the present invention can be assembled conveniently.

The embedding portion of the wire box has a shape selected from one of a group containing a round shape, a triangular shape, a rectangular shape, a pentagonal shape, and a polygonal shape.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A positioning device of a lamp rod used in a ceiling lamp of a wire box comprising a retaining seat fixed to a via hole at a lateral side of the wire box and an inserting rod inserted into the retaining seat; wherein an inserting portion exactly passes through the via hole of the wire box extended from a lateral side of the retaining seat; a positioning ring is locked to an outer periphery of a portion of the inserting portion passing through the wire box for fixing the retaining seat; a top surface of the retaining seat at an inner side of the wire box is a platform; the platform has a through hole and a locking hole;

the platform is locked with a limiting unit having a size exactly locking the inserting rod; the limiting unit is formed by a positioning rod vertically inserted into the through hole of the retaining seat, a spring enclosing the positioning rod, a press with a top and a bottom being protruding with respective sheets; and a top end of the inserting rod has a buckling hole; after the inserting rod has been inserted from the engaging hole of the retaining seat, the buckling hole at the top of the inserting rod is exactly buckled with the embedding portion of the positioning rod;

thereby, inserting rod and the wire box are detachable and thus the space for storage and transfer is reduced.

2. The positioning device of a lamp rod used in a ceiling lamp of a wire box as claimed in claim 1, wherein a bottom of the positioning rod has an embedding portion protruding to an engaging hole of the retaining seat; one face of the embedding portion facing to the inserting end of the inserting rod is a tilt surface; two sides of the upper portion of the embedding portion are extended with buckling blocks which are exactly buckled at an upper side of the through hole for limiting the positioning rod so as not to drop down from the through hole.

3. The positioning device of a lamp rod used in a ceiling lamp of a wire box as claimed in claim 1, wherein the sheets are a top horizontal surface and a lower horizontal surface; the top horizontal surface of the press is engaged with the positioning rod at an upper end of the spring; the lower horizontal surface is exactly aligned to the locking hole of the retaining seat; then a stud locks the press to the retaining seat; then the press is positioned to the upper side of the retaining seat by studs.

4. The positioning device of a lamp rod used in a ceiling lamp of a wire box as claimed in claim 1, wherein a vertical surface of the press is slightly lower than the height of the spring in normal condition; after the press is locked, the spring is slightly compressed and resists against the buckling blocks of the positioning rod so that the positioning rod is positioned to an upper side of the retaining seat.

5. The positioning device of a lamp rod used in a ceiling lamp of a wire box as claimed in claim 1, wherein the embedding portion of the wire box has a shape selected from one of a group containing a round shape, a triangular shape, a rectangular shape, a pentagonal shape, and a polygonal shape.

* * * * *